April 26, 1932.　　　C. D. SMITH　　　1,855,259

TIRE TOOL

Filed March 10, 1931　　2 Sheets-Sheet 1

INVENTOR
CLIFFORD D. SMITH

BY

ATTORNEYS

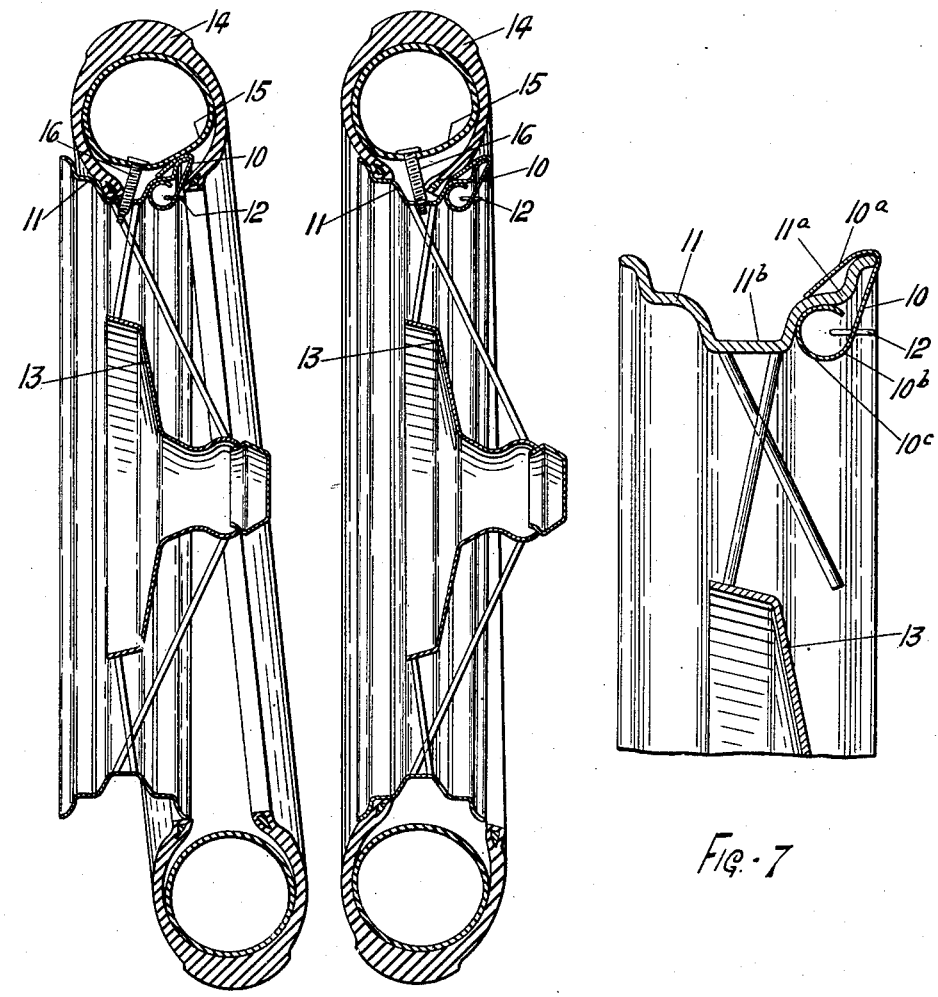

Patented Apr. 26, 1932

1,855,259

UNITED STATES PATENT OFFICE

CLIFFORD D. SMITH, OF FAIRLAWN, OHIO, ASSIGNOR TO THE FIRESTONE TIRE & RUBBER COMPANY, OF AKRON, OHIO, A CORPORATION OF OHIO

TIRE TOOL

Application filed March 10, 1931. Serial No. 521,403.

This invention relates to tire tools such as are used for mounting or removing pneumatic tires from wheel rims, and more especially it relates to tire tools for use with drop-center rims.

The chief objects of the invention are to facilitate the mounting and dismounting of pneumatic tires on drop-center rims; and to provide a tool structure adapted concurrently to engage a tire rim at two spaced apart points. Other objects contemplated are simplicity of construction; low cost; and ease of operation.

Of the accompanying drawings:

Figure 5 is a view of the respective parts shown in Figure 2 showing the first operation of mounting a tire upon a drop-center rim.

Figure 6 is a view similar to Figure 5 showing the final step in the mounting of a tire upon a rim.

Figure 7 is a section, on a larger scale, on the line 7—7 of Figure 4.

Figure 4:
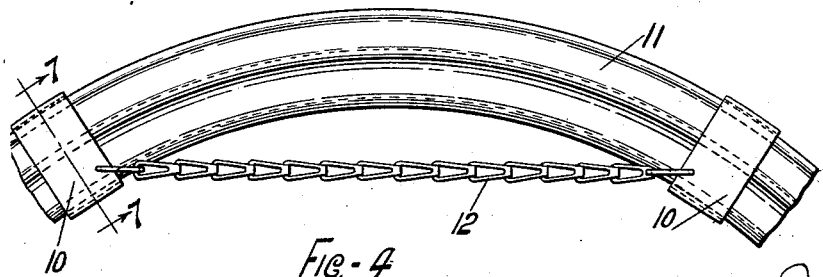
Figure 4 is a front elevation of the improved tire tool as it appears applied to a tire rim, part of the latter being broken away.

Referring now to Figures 4 and 7 of the drawings, the improved tire tool comprises a clip or guide 10 which is made of spring metal and is adapted to be applied to a tire rim, such as the tire rim 11, and to yieldingly engage the same. Preferably the clips 10 are arranged in pairs having a chain 12 of suitable length connecting the respective clips thereof. The arrangement is such that the clips may be applied to a tire rim at two separated points thereon, and be accurately positioned with relation to each other. The chain also serves to prevent lateral displacement of the clips, away from each other, during the mounting and/or dismounting of a tire. The linking together of a pair of the clips lessens the possibility of accidental loss of one or both clips.

As is most clearly shown in Figure 7, each clip 10 consists of a single, transversely-flat strip of spring metal which is bent at an acute angle to provide respective portions $10^a$, $10^b$ of which the portion $10^a$ is positioned upon the outer periphery of the rim 11, when the clip is applied thereto, and the portion $10^b$ is positioned upon the inner periphery of the rim. When so mounted, the portion $10^a$ of the clip extends obliquely from the lateral flange of the rim to the base thereof in such manner as to bridge the circumferential concave portion $11^a$ of the rim in which one of the beads of a tire normally is seated. The portion $10^b$ has its free end portion formed in a loop $10^c$ adapted to fit snugly into the concave portion of the rim formed at the top of the central circumferential "well" $11^b$ therein, said loop $10^c$ also constituting a finger-hold where the clip may be conveniently grasped while applying it to or removing it from the rim 11.

Figures 1, 2, 3:
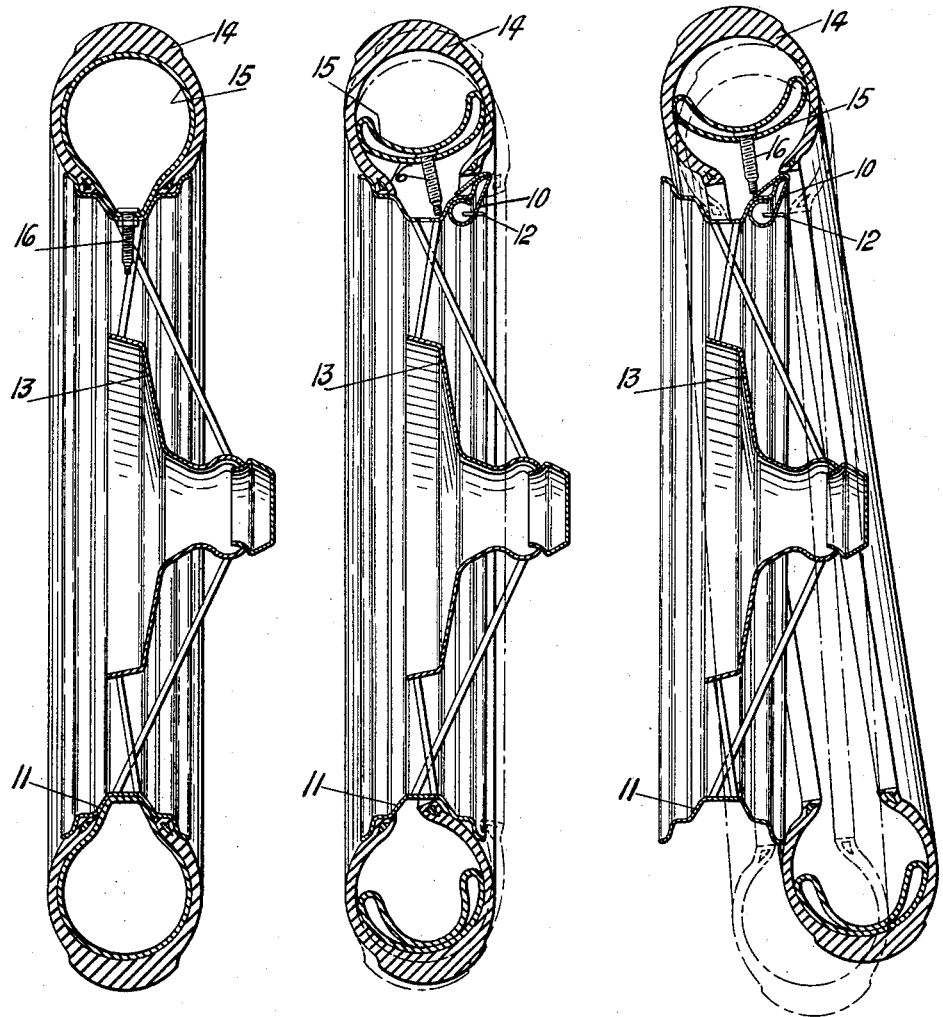
Figure 1 is a diametral section of a vehicle wheel comprising a drop-center rim, and an inflated tire mounted upon the latter.
Figure 2 is a view of the parts shown in Figure 1, and the improved tire tool associated therewith, showing the first and second operations of removing the tire from the rim.
Figure 3 is a view similar to Figure 2 showing the third and fourth operations of removing the tire from the rim.

In Figures 1, 2 and 3 is shown the improved tire tool as it is used in the dismounting of a tire from a rim, and in Figures 5 and 6 the tool is shown in use during the mounting of a tire upon a rim. In these figures the rim 11 is shown as a part of a wheel 13 that is positioned upon a horizontal axis, substantially as it would appear upon an axle, or upon the spare tire carrier of an automobile. A tire 14 and inner tube 15 are depicted in association with the rim 11, the inner tube having the usual valve stem 16.

In removing the tire 14 and tube 15 from the rim 11, the tube 15 first is deflated, and then the outer bead of the tire is pressed laterally inward to permit the clips 10, 10 of the improved tire tool to be snapped over the outer edge of the rim, at the top thereof, as shown and previously explained. The outer bead of the tire, at the bottom thereof, is then pressed laterally off its seat and lifted into the well of the rim, whereby the same tire bead may be lifted over the rim flange at the top of the rim, as is clearly shown in Figure 2. The valve stem 16 is then withdrawn from the aperture in the rim through which it normally protrudes, and the procedure followed with respect to the outer tire bead is repeated with the inner tire bead, as shown in Figure 3, whereby the tire is completely removed from the rim. During the operations described, the clips 10 provide inclined planes leading to the top of the outer rim-flange up which the tire beads easily slide as they are lifted over said rim-flange.

In the mounting of the tire 14 upon the rim 11, the clips 10 are applied to the rim in the manner described before the inner tire bead is placed upon the rim, at the top thereof. The presence of the clips assures that the tire beads, as they are placed upon the top of the rim, will slide naturally into the well of the rim, as is shown in Figures 5 and 6, and not lodge upon the outer bead-seat 11ª of the rim. The arrangement permits the tire beads easily to be passed over the outer rim flange at the bottom of the rim, without such use of prying tools as would strain, bend, or rupture the bead cores.

Modifications are possible within the scope of the appended claims which are not limited wholly to the specific construction shown and described.

What is claimed is:

1. A tire tool consisting of a spring clip adapted to be mounted upon a drop-center tire rim and to be self-sustaining thereon, said clip comprising a straight flat guide portion constituting an inclined plane adapted to extend from the top of the rim flange to the edge of the circumferential well of the rim, and a loop portion connected to said straight flat portion and adapted to fit a concave surface on the exterior of a tire rim.

2. A tire tool consisting of a single strip of metal bent back upon itself at an acute angle, one end of said strip being formed with a straight flat guide portion constituting an inclined plane adapted to extend from the top of the rim flange to the edge of the circumferential well of the rim, the other end of said strip being formed integrally with a loop adapted to fit a concave surface on the exterior of a tire rim and to provide a finger hold, the apex of said acute angle defining a hook for engagement with the top of the rim flange for sustaining the tool in proper engagement with the rim.

3. A tire tool consisting of a strip of comparatively stiff flexible resilient material formed with a portion adapted to extend over the edge of a tire-rim flange and providing an inclined guide from said edge toward the base of the rim and formed with a hook portion for extending under said rim flange, said inclined guide portion and said hook portion being normally spaced so that they are spread apart when engaged on the rim, whereby the tool is snapped on to the rim to be held by the inherent contractile stress in the tool.

4. A tire tool comprising a pair of separate guides adapted to be applied to the flanges of a tire rim at spaced apart points for facilitating the application or removal of a tire over said flanges, and means connecting said guides to each other for determining and limiting the degree of separation of the guides whereby the rim flange will not interfere with movement of the tire over the guides.

CLIFFORD D. SMITH.